(12) United States Patent
Gunter et al.

(10) Patent No.: US 8,439,332 B2
(45) Date of Patent: May 14, 2013

(54) APPARATUS AND METHOD FOR STRINGING AERIAL CABLES USING AIRCRAFT

(75) Inventors: Samuel N. Gunter, Platteville, CO (US); Wayne E. Gunter, Platteville, CO (US)

(73) Assignee: Gunair LLC, Platteville, CO (US)

( * ) Notice: Subject to any disclaimer, the term of this patent is extended or adjusted under 35 U.S.C. 154(b) by 0 days.

(21) Appl. No.: 13/428,921

(22) Filed: Mar. 23, 2012

(65) Prior Publication Data
US 2012/0199799 A1   Aug. 9, 2012

Related U.S. Application Data

(62) Division of application No. 11/835,267, filed on Aug. 7, 2007, now Pat. No. 8,156,624.

(51) Int. Cl.

| | |
|---|---|
| *B23P 19/04* | (2006.01) |
| *B63B 35/03* | (2006.01) |
| *B65H 59/00* | (2006.01) |
| *E21C 29/16* | (2006.01) |
| *H02G 1/08* | (2006.01) |
| *B25B 25/00* | (2006.01) |
| *B25B 9/00* | (2006.01) |
| *B21F 19/00* | (2006.01) |
| *B66F 3/00* | (2006.01) |
| *B66C 1/00* | (2006.01) |
| *E21F 17/02* | (2006.01) |
| *F16L 3/00* | (2006.01) |
| *H02G 1/00* | (2006.01) |

(52) U.S. Cl.
USPC ........... 254/239; 254/134.3 PA; 254/134.3 R; 294/100; 248/59

(58) Field of Classification Search ............... 29/239; 254/134.3 PA, 134.3 R, 134.3 PT; 294/82 R, 294/100; 224/137 R; 258/1.2; 248/59
See application file for complete search history.

(56) References Cited

U.S. PATENT DOCUMENTS

| 2,663,748 | A |   | 12/1953 | Carr et al. |
|---|---|---|---|---|
| 3,011,765 | A |   | 12/1961 | Sherman |
| 3,271,009 | A | * | 9/1966 | Wright et al. .......... 254/134.3 R |
| 3,868,089 | A |   | 2/1975 | Lindsey et al. |
| 4,006,884 | A | * | 2/1977 | Lederhos et al. .... 254/134.3 PA |

(Continued)

OTHER PUBLICATIONS

International Search Report for PCT/US2008/072106, International Searching Authority, Nov. 5, 2008, pp. 1-12.

*Primary Examiner* — Lee D Wilson
*Assistant Examiner* — Alvin Grant
(74) *Attorney, Agent, or Firm* — Samuel M. Freund; Cochran Freund & Young LLC

(57) ABSTRACT

Apparatus and method for stringing aerial cables through tower structures using aircraft without requirement that a person be present on the tower while the aircraft is performing the stringing operation are described. An elongated needle-like threading member to which a sock line is attached and having spaced-apart projections emanating therefrom at different directions around the threading member, is directed by the aircraft pilot through a block having a pulley suspended by an insulator or other tower structure, the projections in cooperation with the block preventing the threading member from being pulled rearwardly under tension from the sock line. A device adapted for grabbing and releasing the threading member and attached to an aircraft haul line, permits the threading member to be hauled forward through the block once the aircraft flies to the other side of the tower and reattaches the grabbing device to the threading member.

6 Claims, 9 Drawing Sheets

U.S. PATENT DOCUMENTS

| | | |
|---|---|---|
| 4,129,287 A | 12/1978 | Lindsey et al. |
| 4,247,084 A * | 1/1981 | Lindsey et al. ...... 254/134.3 PA |
| 4,278,237 A | 7/1981 | Bergman et al. |
| 4,328,952 A * | 5/1982 | Chapman ................ 254/134.3 R |
| 4,348,009 A | 9/1982 | Chapman |
| 4,386,758 A * | 6/1983 | Despins ................ 254/134.3 R |
| 4,421,301 A | 12/1983 | Chapman |
| 4,431,165 A | 2/1984 | Chapman |
| 4,487,395 A * | 12/1984 | Despins ................ 254/134.3 R |
| 4,494,732 A * | 1/1985 | Waymire ................ 254/134.3 R |
| 4,596,379 A * | 6/1986 | Saracini ................ 254/134.3 PA |
| 5,039,064 A | 8/1991 | Feuvrier |
| 5,178,368 A * | 1/1993 | Saracini ................ 254/134.3 PA |
| 5,813,658 A | 9/1998 | Kaminski et al. |
| 5,927,649 A | 7/1999 | Nykiforuk |
| 6,375,163 B1 | 4/2002 | Carlson et al. |
| 6,769,514 B2 * | 8/2004 | Ed ................ 182/150 |

* cited by examiner

APPARATUS AND METHOD FOR STRINGING AERIAL CABLES USING AIRCRAFT

RELATED CASES

This application is a Divisional Application of U.S. patent application Ser. No. 11/835,267, which was filed on Aug. 7, 2007 now U.S. Pat. No. 8,156,624, entitled "Apparatus and Method for Stringing Aerial Cables Using Aircraft", the disclosure of which is hereby specifically incorporated by reference herein for all that it discloses and teaches.

FIELD OF THE INVENTION

The present invention relates generally to installing aerial cables and, more particularly to apparatus and method for stringing aerial cables using aircraft.

BACKGROUND OF THE INVENTION

Advantages of stringing power conductor cables by electric utility companies within transmission and distribution networks using helicopters to advance a conductor towing line or sock line already threaded through a stringing block suspended from an insulator or other tower structure on one tower, to the next tower are well known. However, before the helicopter can advance to the next tower, the sock line must first be placed onto the pulley of the stringing block which at least requires an additional step to be taken by the helicopter pilot if the process is to be accomplished from the air, complex hardware must be mounted on the tower being strung, or at least one person must be located on the tower in the helicopter wash during the stringing process.

Stringing blocks having sheaved wheels and spring-biased fly gates and helicopter loading arms are generally used to facilitate side-loading of power conductor cables. This technology has been useful only for transmission cables hung from portions of a tower which can be accessed from above or from the side. That is, towers having an upper cross support, but no side access, for example, electrical conductors surrounded by a closed-sided, window-like structure, have not been threaded by aircraft using such blocks.

Airborne stringing of a sock or threading line through power line towers having no side access, however, has been described using elongated threading members having the sock line secured to the trailing end thereof, having leading and trailing helicopter hoist line coupling parts for facilitating the suspension of the threading members from an aircraft, and having at least one tower catch for holding the threading member on the tower structure while the hoist line is released and reattached to the threading member. The latter operation has been carried out entirely by the aircraft without the necessity of personnel or apparatus on the tower during the proximity of the aircraft thereto, but requires an additional step by the aircraft pilot of moving the sock line onto a pulley.

Accordingly, it is an object of the present invention to provide an apparatus and method for airborne threading a sock line through a block having a pulley disposed on a tower.

It is also an object of the present invention to provide an apparatus and method for airborne threading a sock line through a block having a pulley centrally disposed on a tower and surrounded by a closed-sided, window-like tower structure.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for stringing aerial cables through a tower structure using aircraft, hereof, includes: an elongated tubular threading member having a longitudinal axis, a forward end and a rearward end, and having a wall through which a plurality of spaced-apart, longitudinal slots are formed; a plurality of projections, each projection having a rearward end, a pivoted end, and a long dimension therebetween, each projection being pivotably mounted in the vicinity of the pivoted end thereof within the threading member such that the rearward end of each projection can extend through one of the longitudinal slots, thereby being capable of freely moving from an approximately perpendicular position relative to the axis of the threading member to a position along the axis; means for securing a sock line to the rearward end of the threading member; a block disposed on the tower structure having at least one pulley and a frame member adapted to receive and releasably hold the threading member on the pulley when engaged by one of the projections; and means for releasably attaching an aircraft haul line to the threading member.

In another aspect of the present invention and in accordance with its objects and purposes, the apparatus for stringing aerial cables through a tower structure using aircraft, hereof, includes: an elongated tubular threading member having a longitudinal axis, a forward end and a rearward end, and having a wall through which a plurality of spaced-apart, longitudinal slots are formed; a plurality of projections, each projection having a rearward end, a pivoted end, and a long dimension therebetween, each projection being pivotably mounted in the vicinity of the pivoted end thereof within the threading member such that the rearward end of each projection can extend through one longitudinal slot, thereby being capable of being moved from an approximately perpendicular position relative to the axis of the threading member to a position along the axis thereof; means for securing a sock line to the rearward end of the threading member; a block disposed on the tower structure having at least one pulley and a frame member adapted to receive and releasably hold the threading member on the pulley when engaged by one of the projections; a plurality of spring members, at least one spring member for each of said projections, for reversibly maintaining each projection at the approximately perpendicular position; and means for releasably attaching an aircraft haul line to the threading member.

In still another aspect of the present invention and in accordance with its objects and purposes, the method for stringing aerial cables through a tower structure using aircraft, hereof, includes the steps of: threading a length of an elongated tubular member releasably attached to an aircraft haul line, to which a sock line is secured, and having a plurality of spaced-apart projections extending from the surface thereof which can be pivoted into the interior of the tubular member, through a block supported on the tower structure having a pulley and a frame member disposed on one side of the pulley adapted to receive and releasably hold the tubular member on the pulley when engaged by at least one of the projections, using an aircraft; detaching the aircraft haul line from the tubular member; moving the aircraft around the tower structure such that the length of the elongated member threaded through the receiving member can be accessed thereby; attaching the aircraft haul line to the length thereof threaded through the receiving member; and hauling the tubular member to another tower.

Benefits and advantages of the present invention include, but are not limited to, providing apparatus and method for stringing aerial cables through enclosed tower structures using aircraft without the assistance of personnel located on the tower structure while the aircraft is present.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a side view of one embodiment of the elongated threading member of the present invention, illustrating a plurality of pivoted projections, alternately pivoted perpendicularly to the projection located immediately before it, each projection capable of extending no more than approximately perpendicularly to the surface of the threading member in either of two directions about 180° apart, depending on which direction is oriented more closely toward the ground; a weighted nose section; and a rear portion to which a sock line can be attached, while

FIG. 3A is a schematic representation of a front view of an embodiment of a block of the present invention illustrating a hood or collar mounted on a frame member on one side thereof for guiding the threading member onto the block, while

FIG. 4A is a schematic representation of a side view of another embodiment of the block of the present invention, showing two horizontally disposed pulleys which are adapted to receive the threading member hereof, the collar shown in FIG. 3A and a third pulley disposed above the horizontal pulleys for guiding the threading member thereonto, while

FIG. 7A is a schematic representation of a front view of a modified helicopter cargo hook embodiment of a fixture for engaging and releasing the threading member shown in FIG. 1 hereof, illustrating an inverted U-shaped fixture having an attachment arm for attachment to an aircraft haul line, a depression for receiving the threading member, a locking apparatus driven electrically or mechanically for releasably capturing the threading member in the depression, and illustrated as a sliding member, and two extension portions forming a "U" for guiding the fixture over the threading member such that it may readily enter the depression, while

DETAILED DESCRIPTION OF THE INVENTION

Figure 1A:
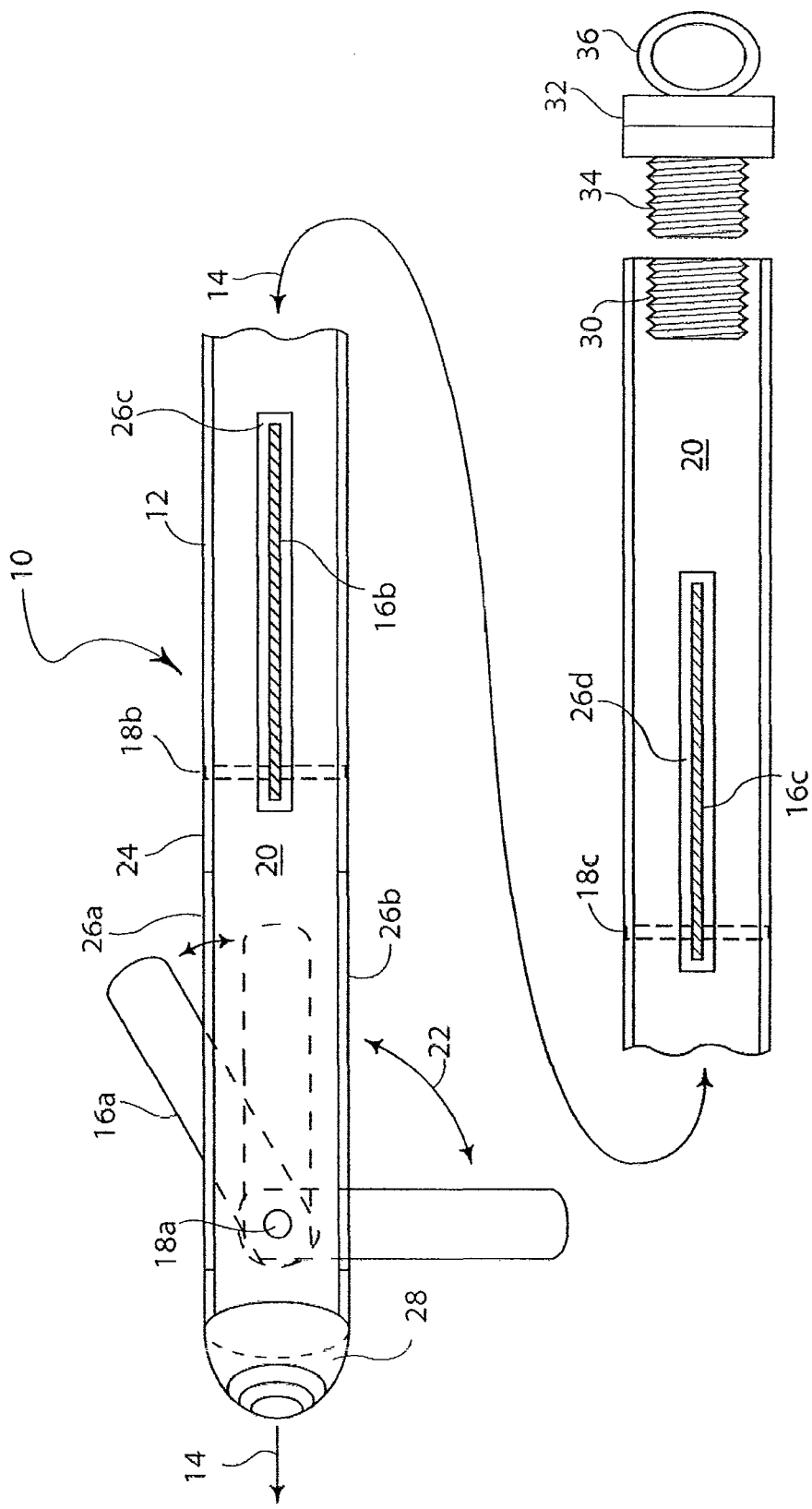

Briefly, the present invention includes apparatus and method for enabling the stringing of aerial cables, such as high-voltage electrical cables, as an example, through tower structures which may be inaccessible from the side using aircraft, such as helicopters or dirigibles, as examples, without requiring a person to be present on the tower while the helicopter is performing the stringing operation. The apparatus is suitable for directly stringing at least relatively short lengths of power line, where the weight of a typical length of power line would be too great for lifting by the aircraft. Further, power lines and electrical conductors are vulnerable to nicks and scratches. A sock line or haul line, which is considerably lighter and more durable than the cables, is therefore used in the initial part of the stringing process. Typical sock lines may be stranded cables made of strong, lightweight materials such as steel, nylon or polyethylene, and the like.

An embodiment of the invention may include an elongated needle-like threading member to which a sock line is attached, and a plurality of generally outwardly facing projections emanating therefrom at different directions around the threading member and spaced-apart from other projections, wherein the projections are responsive to gravity or spring action in such a manner that the projections can be made to retract into the threading member or lay flat along the surface thereof when a modest force is applied thereto. A block including at least one pulley may be hung from an insulator disposed on the tower or otherwise suspended from the tower structure, the block being adapted to receive the threading member, the projections in cooperation with a frame member which may be attached to the block on the side thereof facing toward the incoming threading member, keeping the threading member from being pulled rearwardly under the influence of tension from the sock line, the frame member accomplishing this purpose by releasably engaging at least one of the projections emanating from the threading member as the threading member is pushed therethrough. A conical shaped hood may be attached to the frame member of the block again facing the advancing threading member such that the threading member can more readily be inserted through the frame member of the block. A grappling hook or other holding device, such as a modified helicopter cargo hook, adapted for holding and releasing the threading member and attached to an aircraft haul line, permits the threading member to be pulled forward, at least one projection also preventing the threading member from slipping rearwardly out of the holding device under the influence of tension on the sock line.

It should be mentioned that the frame member may be square, rectangular, oval, circular, or any suitable shape, and that the deployment of the projections may be controlled from the aircraft if a solenoid or suitable mechanical device is used to operate the movement thereof into and out of the threading member.

In use, the holding device may be attached to the threading member to the rear of the forward end thereof, and prevented from being pulled rearwardly by the action of one of the projections engaging the holding device, and the sock line may be fed from a spool disposed on the ground at one end of the series of towers onto which cable is to be strung, as the aircraft moves forward toward one side of a tower. The block may be attached to the lower end of an insulator mounted on the tower structure to facilitate the stringing operation. The forward portion of the threading member is guided through the frame member and onto the pulley of the block where it is held by the action of least one projection engaging the frame member and rearward tension from the spool feeding the sock line. It is to be noted that the projections are deployed at an angle of less than about 90° from the surface of the threading member. The holding device is then detached from the threading member and the aircraft flown to the other side of the tower. The holding device is reattached to the forward portion of the threading member extending through the block, and the threading member is pulled forward through the block. When a sufficient length of the threading member is pulled through the block, the holding device may release the threading member, the threading member again being held from sliding rearwardly in the block by at least one projection engaging the frame member, and the holding device is again attached to the threading member more rearwardly from the front portion thereof to permit a more horizontal deployment of the forward end of the threading member. The holding device to which the haul line is attached may again be attached to the threading member, and the threading member is hauled to the next tower by the aircraft. It should be mentioned that as the threading member is directed through the frame member and onto the at least one pulley of the block, the projections may be pivoted toward the axis of the threading member (that is, to angles smaller than 90°) and even into the threading member, as will be described hereinbelow, as a result of the rearward forces thereupon.

Once the sock line is strung through the desired series of towers using an aircraft and without the requirement of personnel on the tower structures during the stringing process, the sock line may be attached to a coupling connected to an end of the power line or conductor to be strung. A winch-type puller, also disposed on the ground, may then pull the sock line back to its starting position on the drum, thereby threading the power line connected thereto through the blocks in the reverse direction from the threading procedure involving the sock line. During the threading of the power line through the block it may be maintained in tension by conventional tensioner apparatus on the ground. After the power line is threaded through the chosen number of towers, the block may be replaced by a tensioning device for clamping the electrical cables and located on the insulators using well-known winching and attachment technology.

Reference will now be made in detail to the present embodiments of the invention, examples of which are illustrated in the accompanying drawings. In the Figures, similar structure will be identified using identical callouts. Turning now to FIG. 1A, a schematic representation of a side view of one embodiment of the elongated threading member, 10, of the present invention is shown as tubular member, 12, having axis of symmetry, 14, illustrating a plurality of pivoted projections, 16a-16c, alternately pivoted, 18a-18c, perpendicularly to the projection located immediately before it, each projection capable of moving from the interior, 20, of tubular member 12 no more than approximately perpendicularly, 22, to surface, 24, through slots, 26a-26d, of tubular member 12 in either of two directions about 180° apart depending on which direction is oriented more closely toward the downward direction; that is, each of slots 26 has an opposing coextensive slot, and may freely pivot from one side of tubular member 12 to the other; weighted nose section, 28; and rear internally threaded portion, 30, to which a number of elements may be attached. Also shown in FIG. 1A is rotatable sock line attachment, 32, having male threaded portion, 34, adapted to be received by internally threaded portion 30, and eyelet, 36. Clearly, many relative orientations of pivoted projections 16 may be anticipated.

In another embodiment of the present invention, not shown in the FIGURES, each of slots 26 does not have an opposing slot. Projections 16 therefore emerge from surface 24 of tubular member 12 in one direction only.

Tubular member 12, pivots 18, projections 16 and weighting materials 28 may be made of steel, aluminum, titanium, brass, and the like, the principal prerequisite being that the various parts be sufficiently compatible and sturdy to support their intended use.

Figure 1B:
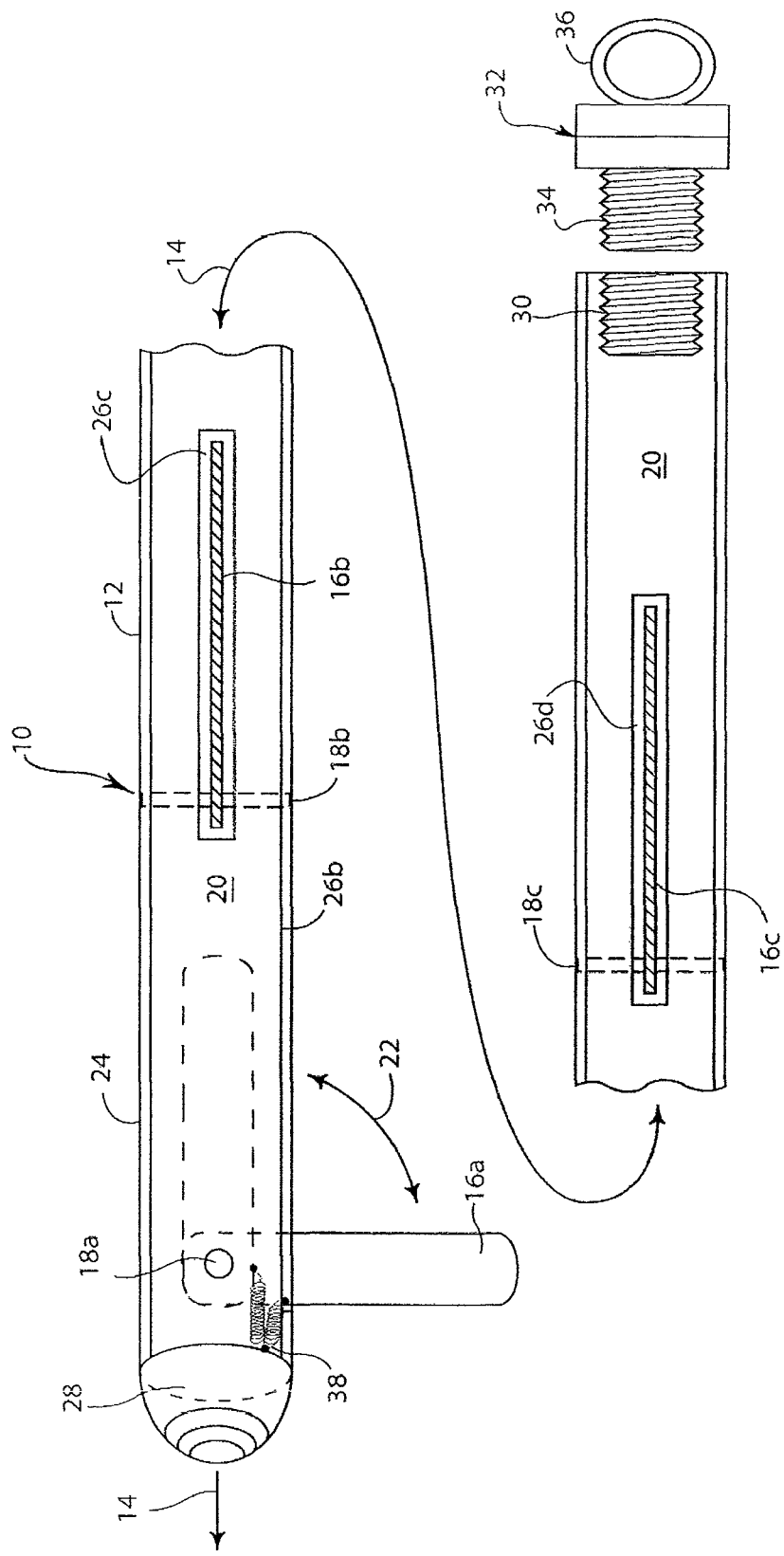
FIG. 1B is a schematic representation of a side view of another embodiment of the elongated threading member hereof, illustrating at least one spring disposed within the tubular portion of the threading member for holding the corresponding projection approximately perpendicular to the surface of the threading member.

FIG. 1B is a schematic representation of a side view of yet another embodiment of elongated threading member 10 hereof, illustrating at least one spring, 38, disposed within 20 tubular portion 12 of threading member 10 for holding the corresponding projection 16 approximately perpendicular 22 to the surface of the threading member. As will be described in more detail hereinbelow, projections 16 cannot be forced forward of the approximately 90° angle to the surface 24 of tubular member 12, but can be moved backward into corresponding slots 26 with little force. Although projections 16 are alternatively shown as being approximately perpendicular, many relative orientations thereof may be anticipated.

Figure 2:
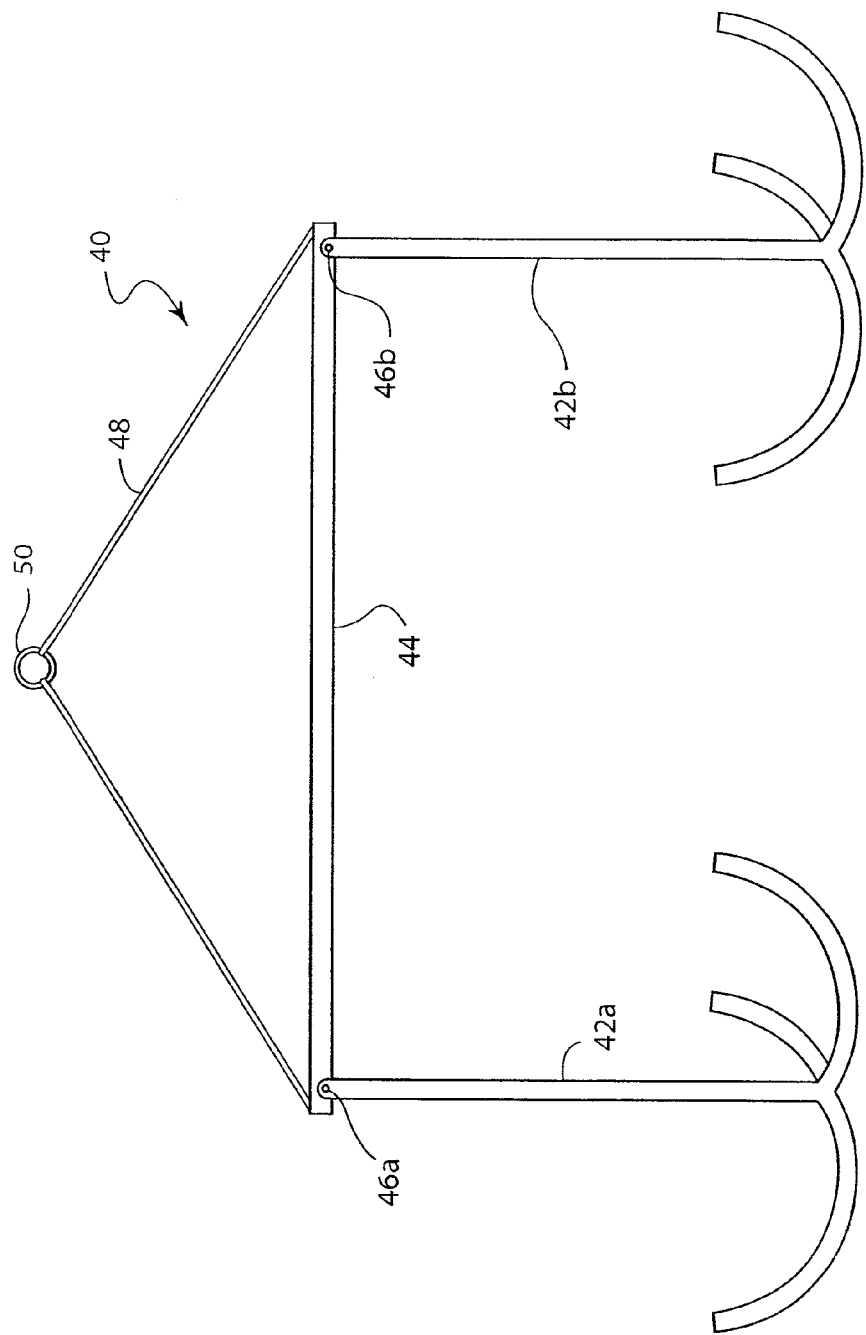
FIG. 2 is a schematic representation of an embodiment of a fixture adapted for releasably engaging the threading member illustrated in FIG. 1 hereof, illustrating two grappling hooks and means for attaching the fixture to an aircraft haul line.

FIG. 2 is a schematic representation of an embodiment of fixture, 40, adapted for releasably engaging threading 10 member illustrated in FIG. 1 hereof, illustrating two grappling hooks, 42a and 42b, attached to bar, 44, by pivoting means, 46a and 46b, and means, 48, including ring, 50, for attaching fixture 40 to an aircraft haul line. For some applications, a single grappling hook may be sufficient.

Figure 3A:
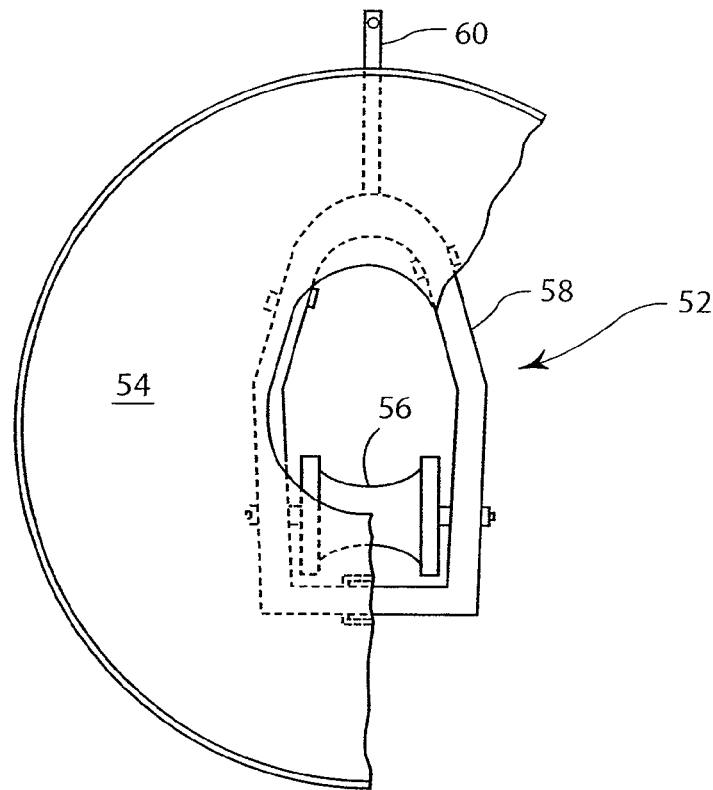
Figure 3B:
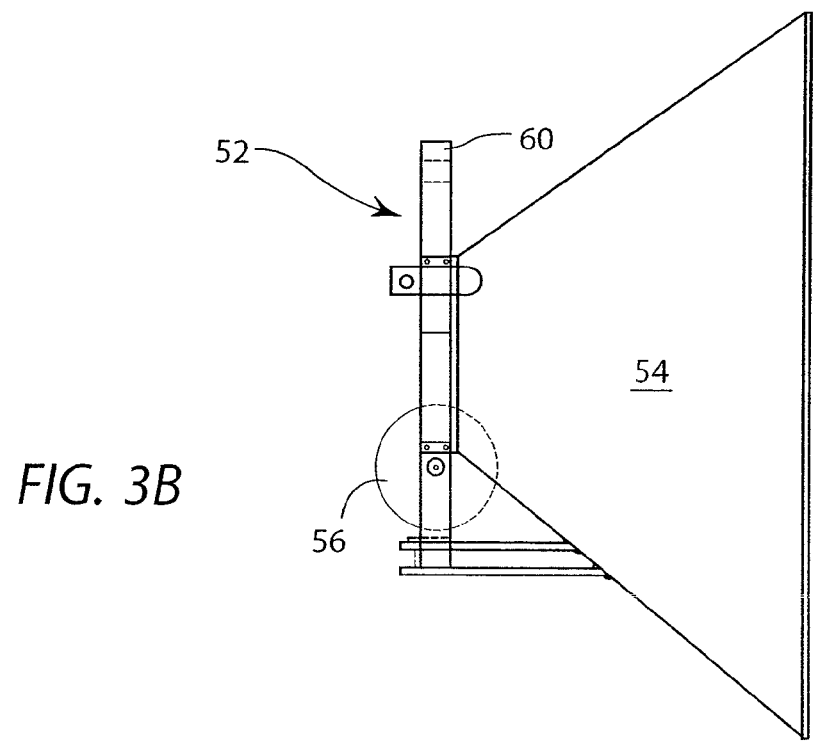
FIG. 3B is a schematic representation of a side view thereof.

FIG. 3A is a schematic representation of the front view of an embodiment of block, 52, of the present invention illustrating hood or collar, 54, on the side thereof facing an incoming threading member 10, for guiding the threading member onto pulley, 56. frame member, 58, both holds collar 54, and prevents threading member 10 from sliding backwards out of block 52 once projections 16 thereof are deployed and at least one projection 16 engages frame member 58. In use, threading member 10 is directed through collar 54 and frame member 58 by an aircraft pilot. During its passage therethrough, extended projections 16 are forced toward tubular member 22 if they contact portions of the block or frame member. Once through receiving member 58, those projections not otherwise prevented from again deploying, move outward from the tubular member, thereby preventing the threading member from exiting block 52 in the reverse direction from which it entered. Hanger, 60, permits block 52 to be suspended directly from the tower structure, or from an insulator suspended from the tower structure. FIG. 3B is a schematic representation of a side view of block 52 shown in FIG. 3A hereof. It should be mentioned that block 52 may under some circumstances be used without hood 54.

Figure 4A:
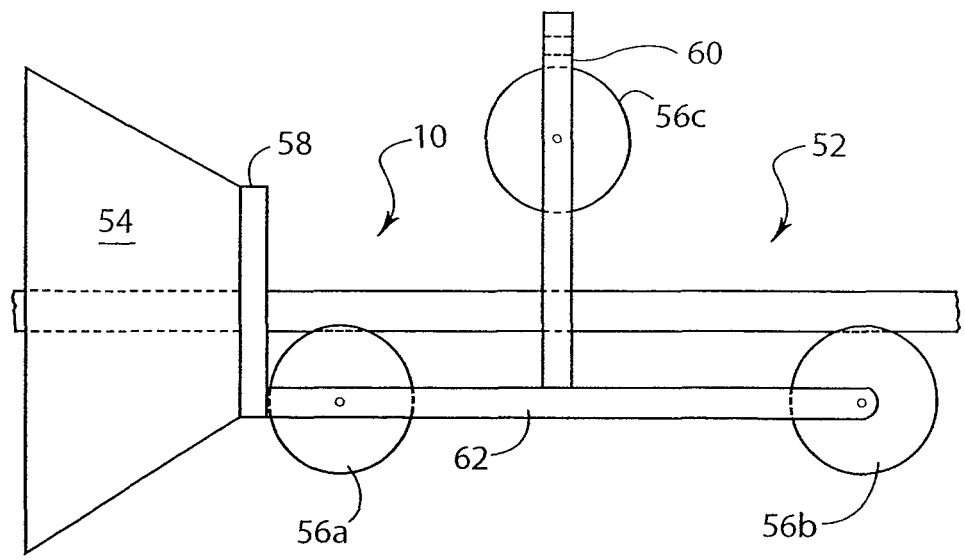
Figure 4B:
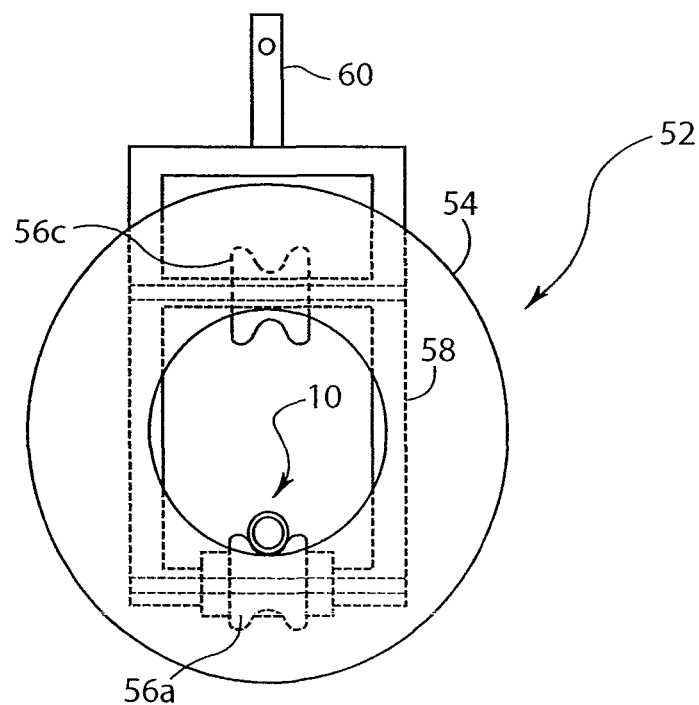
FIG. 4B is a schematic representation of the front view thereof, illustrating a hanger for attachment to an insulator or other portion of the tower.

FIG. 4A is a schematic representation of a side view of another embodiment of a traveler block 52, showing two horizontally disposed pulleys, 56a and 56b, which are adapted to receive threading member 10 supported by bar, 62, collar 54 and window-shaped receiving member 58, also supported by bar 62. Third pulley, 56c, disposed on hanger 60, supported by bar 62, and disposed above horizontal pulleys 56a and 56b, assists in guiding the threading member onto the horizontal pulleys once a sufficient length of threading member 10 is passed through hood 54. In use, threading member 10 is directed through collar 54 and frame member 58 by an aircraft pilot. During its passage therethrough, extended projections are moved toward tubular member 22 if they contact portions of the sheave block. Once through frame member 58, those projections (not shown in FIG. 4A) not otherwise prevented from again deploying, move outward from tubular member, thereby preventing the threading member from exiting block 52 in the reverse direction from which it entered. Hanger, 60, permits block 52 to be suspended directly from the tower structure, or from an insulator suspended from the tower structure. FIG. 4B is a schematic representation of a side view of block 52 shown in FIG. 4A hereof, illustrating hanger 60 in more detail. It should be mentioned that block 52 may under some circumstances be used without hood 54.

Figure 5:
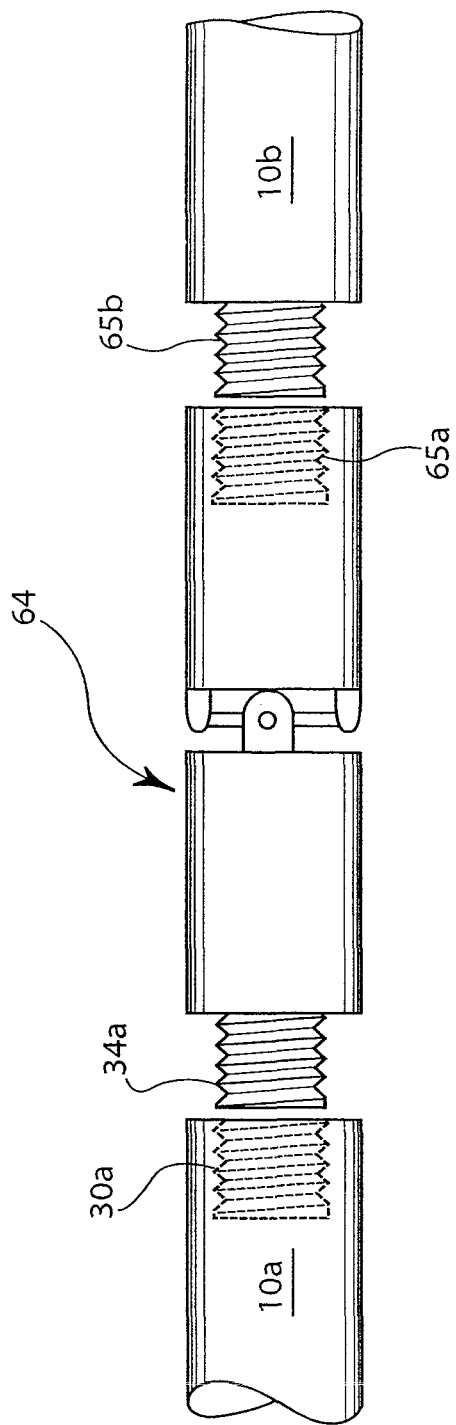
FIG. 5 is a schematic representation of a side view of a universal joint shown connecting two sections of a threading member.

FIG. 5 is a schematic representation of a side view of universal joint, 64, shown connecting two sections, 10a and 10b, of threading member 10. Shown, are female threaded portion, 30a, in section 10a adapted to receive male threaded portion, 34a, on universal joint 64, and female threaded portion, 65a, on universal joint 64 adapted to receive male threaded portion, 65b, on section 10b. In some situations, it may be advantageous to have threading member 10 comprised of more than one section. This may occur if the overall weight of the sock line becomes important in order to permit the forward portion of the threading member to be transported in an approximately horizontal manner to facilitate guiding the threading member through receiving member 58 in block 52. Distributing weights inside the tubular members comprising sections 10a and 10b may also assist in enabling the forward portion of the threading member to be transported in an approximately horizontal manner as well.

Figure 6:
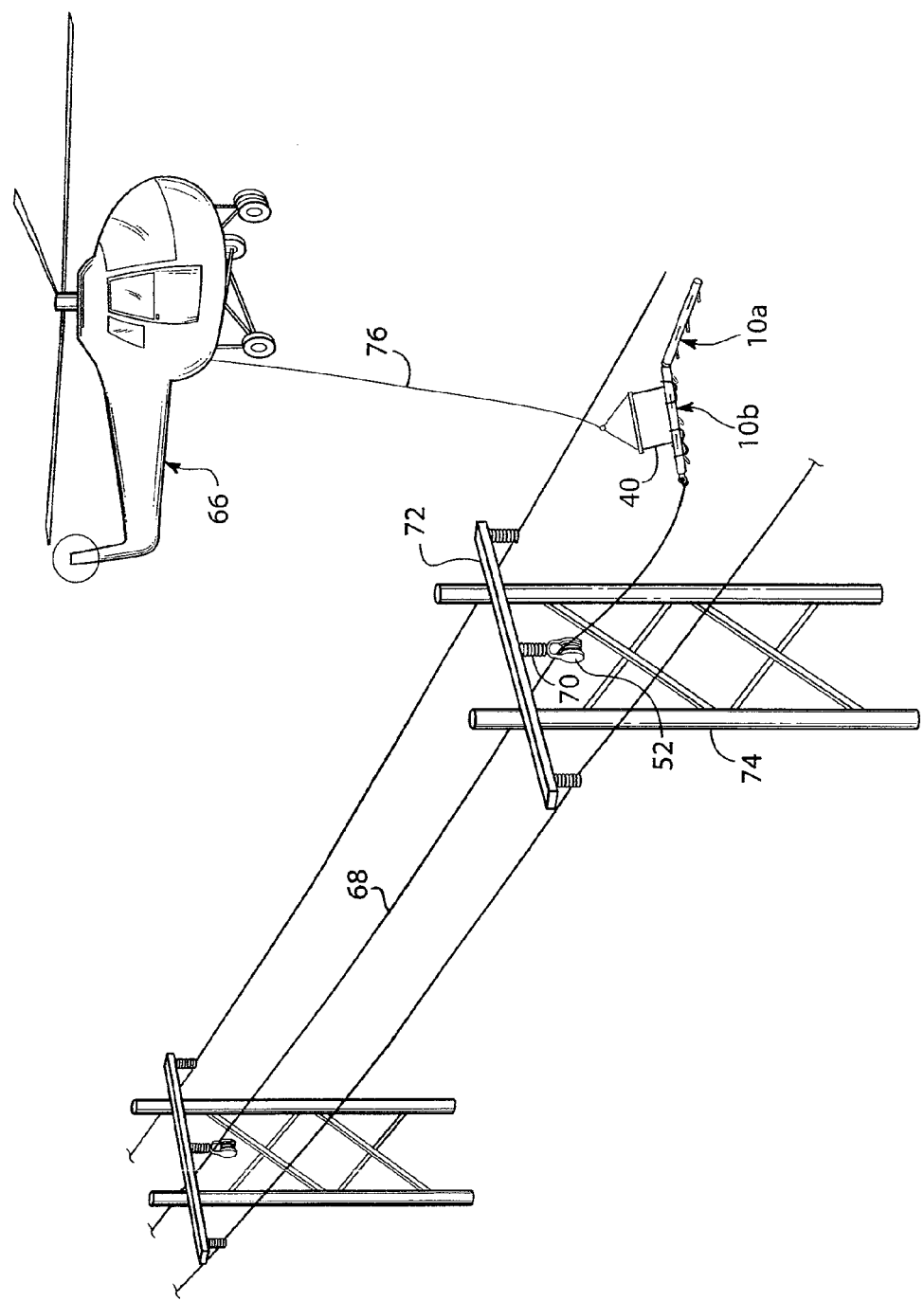
FIG. 6 is a schematic representation of a helicopter having completed stringing a sock line through a block on one tower and hauling the threading member, shown as a two section member, toward a corresponding block on the next tower and using the two grappling hook fixture illustrated in FIG. 2 hereof.

FIG. 6 is a schematic representation of helicopter, 66, having completed stringing sock line, 68, through block 52 supported by insulator, 70, mounted on cross member, 72, of tower, 74, and pulling threading member 10, shown having two portions 10a and 10b, toward a corresponding sheave block on the next tower. Fixture 40 (the two grappling hook embodiment illustrated in FIG. 2 hereof) is attached to helicopter haul line, 76.

Figure 7A:
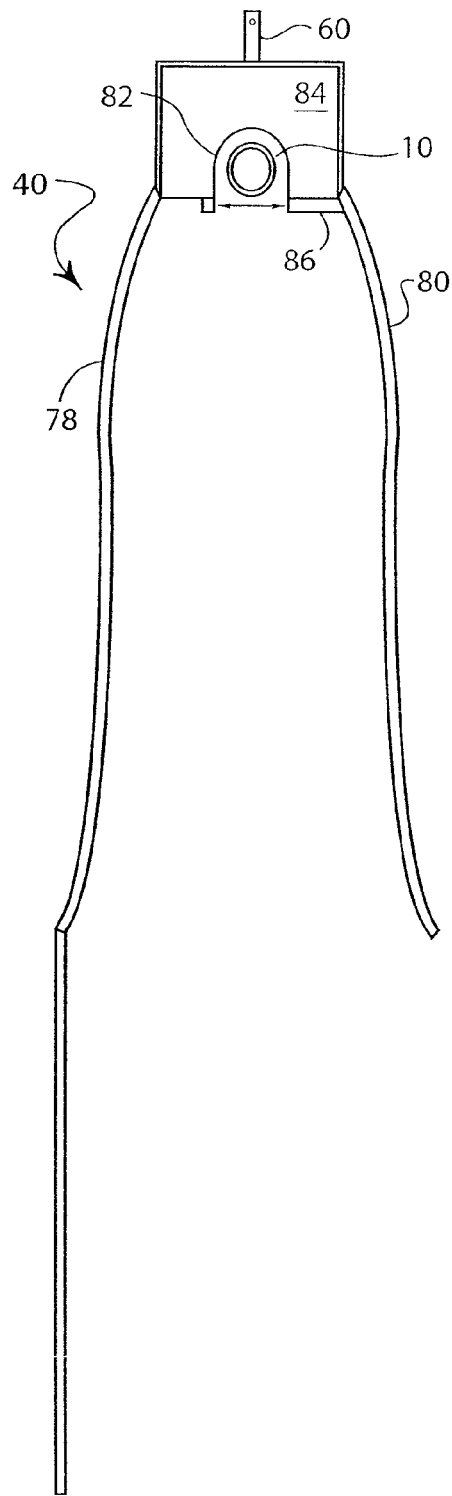
Figure 7B:
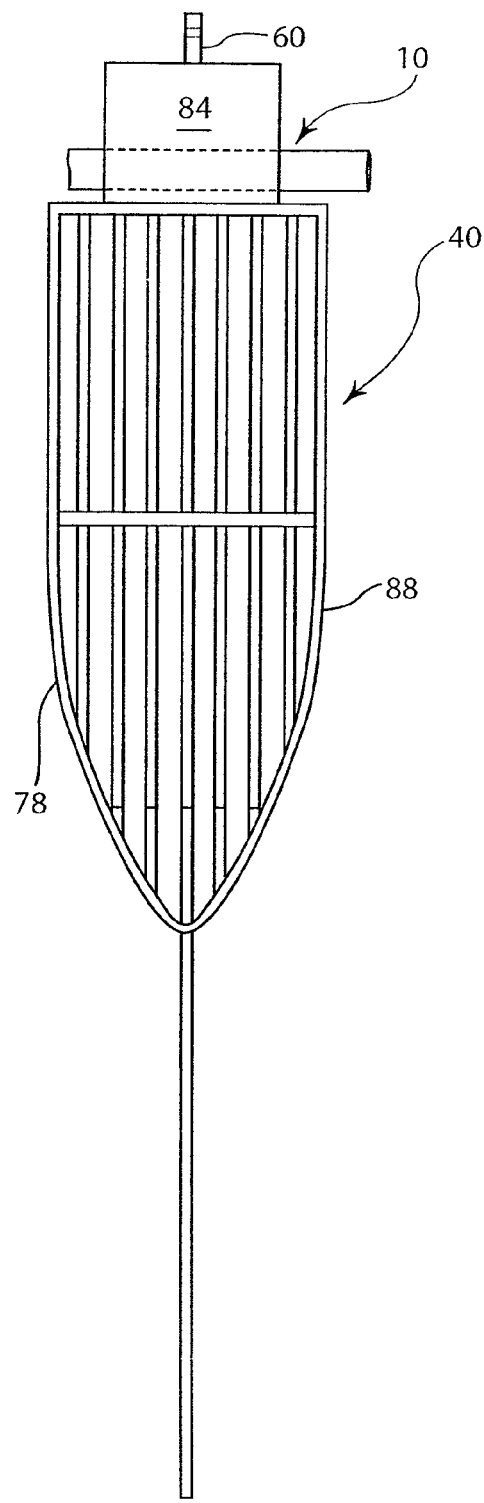
FIG. 7B shows a side view thereof illustrating at least one extension portion having a grid structure for assisting in the alignment of the threading member with the depression of the U-shaped fixture.

FIG. 7A is a schematic representation of a front view of a modified helicopter cargo hook embodiment of fixture 40 for engaging and releasing threading member 10, illustrating inverted arms, 78 and 80, together forming a U-shape; attachment arm 60 for securing fixture 40 to an aircraft haul line; depression, 82, for receiving the threading member; and locking apparatus, 84, having slide, 86, driven electrically or mechanically from an aircraft for releasably capturing threading member 10 in depression 82. Arms 78 and 80 assist in guiding fixture 40 over the threading member such that it may readily enter depression 82. FIG. 7B shows a side view of fixture 40 illustrating cage-like portion, 88, of arm 78 for assisting in the alignment of the threading member with depression 82.

Figure 8:
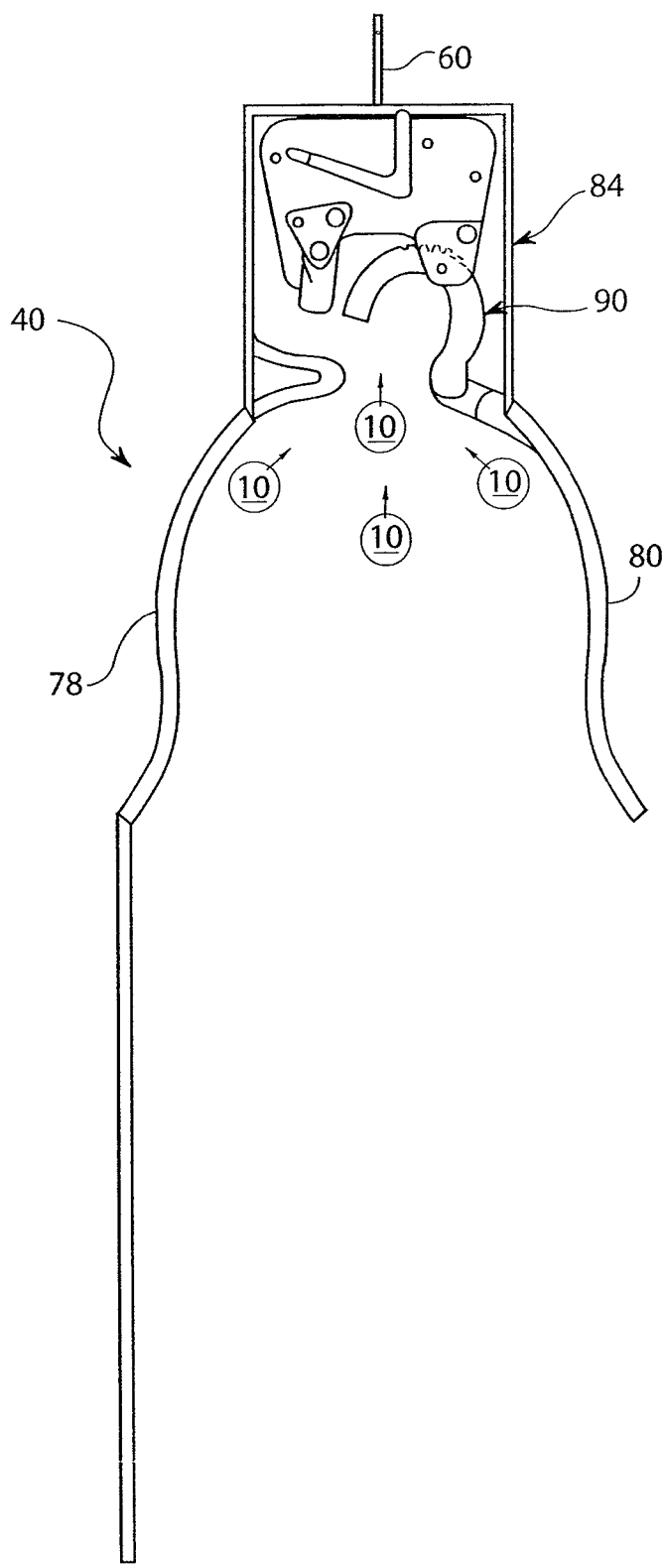
FIG. 8 is a schematic representation of a front view another embodiment of the modified helicopter cargo hook fixture shown in FIGS. 7A and 7B hereof, adapted for attachment to an aircraft haul line and for releasably engaging the threading member shown in FIG. 1 hereof, illustrating an invertible hook-like locking and unlocking apparatus electronically or mechanically controlled from the aircraft for capturing the threading member.

FIG. 8 is a schematic representation of a front view another embodiment of a modified helicopter cargo hook embodiment of fixture 40 shown in FIGS. 7A and 7B hereof adapted for attachment to an aircraft haul line and for releasably engaging threading member 10. Invertible hook-like locking and unlocking apparatus, 90, releasably captures threading member 10 and is driven electrically or mechanically from an aircraft, arms 78 and 80 together forming a U-shape assist in guiding fixture 40 over threading member 10 and into the vicinity of locking member 90. Shown is threading member 10 approaching locking member 90 from several directions.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for stringing aerial cables through a tower structure using aircraft, comprising the steps of:
    threading a length of an elongated tubular member releasably attached to an aircraft haul line, to which a sock line is secured, and having a plurality of rearward facing projections extending from the surface thereof, wherein a selected number of the plurality of projections are capable of freely pivoting to a position approximately perpendicular to the surface along a first longitudinal line on the surface of the tubular member and the remaining projections are capable of freely pivoting to a position approximately perpendicular to the surface along a second longitudinal line on the surface, not collinear with the first line, each projection of the plurality of projections being capable of pivoting through the tubular member to a location approximately perpendicular to an opposing surface of the tubular member, through a block supported on the tower structure, having a pulley and a frame member disposed on one side of the pulley adapted to receive and releasably hold the tubular member on the pulley when engaged by at least one of the plurality of projections, using an aircraft;
    detaching the aircraft haul line from the tubular member;
    moving the aircraft around the tower structure such that the length of the elongated member threaded through the frame member can be accessed thereby;
    attaching the aircraft haul line to the length thereof threaded through the receiving member; and hauling the tubular member to another tower.

2. The method as described in claim 1, wherein the aircraft comprises a helicopter.

3. The method as described in claim 1, wherein said aircraft comprises a dirigible.

4. The method as described in claim 1, wherein the block further comprises a conical-shaped hooded portion disposed in the vicinity of the frame member of the block for facilitating the placement of the tubular member onto the pulley.

5. The method as described in claim 1, wherein the tower structure comprises an electrical insulator affixed thereto, and the block is affixed to the electrical insulator.

6. The method as described in claim 5, wherein the tower structure comprises a closed-sided, window-like structure enclosing the electrical insulator.

\* \* \* \* \*